Figure 1:
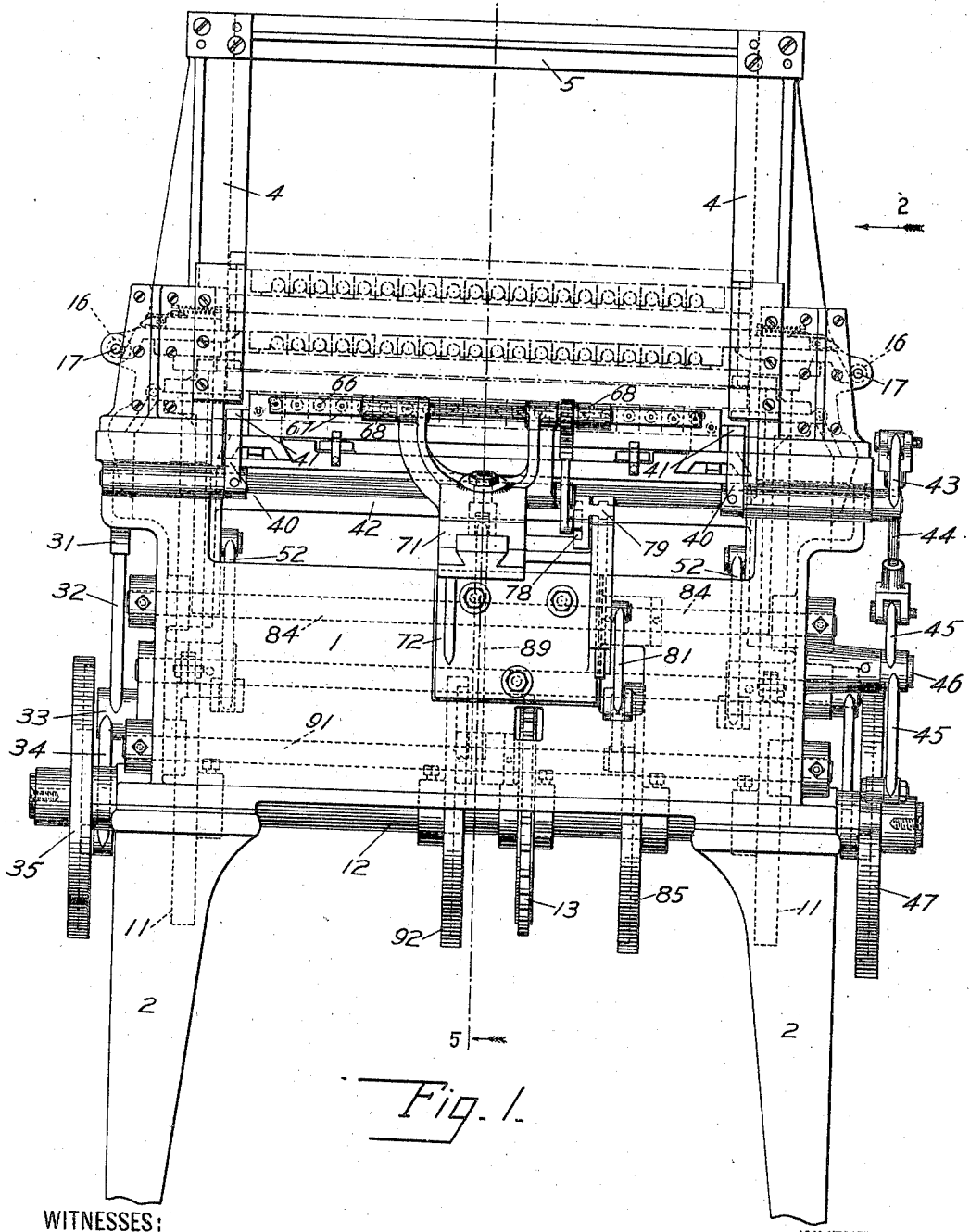

O. TYBERG.
MACHINE FOR REMOVING CIGAR BUNCHES FROM MOLDS.
APPLICATION FILED MAR. 28, 1901.

947,869.

Patented Feb. 1, 1910.

6 SHEETS—SHEET 3.

WITNESSES:

INVENTOR

ATTORNEYS

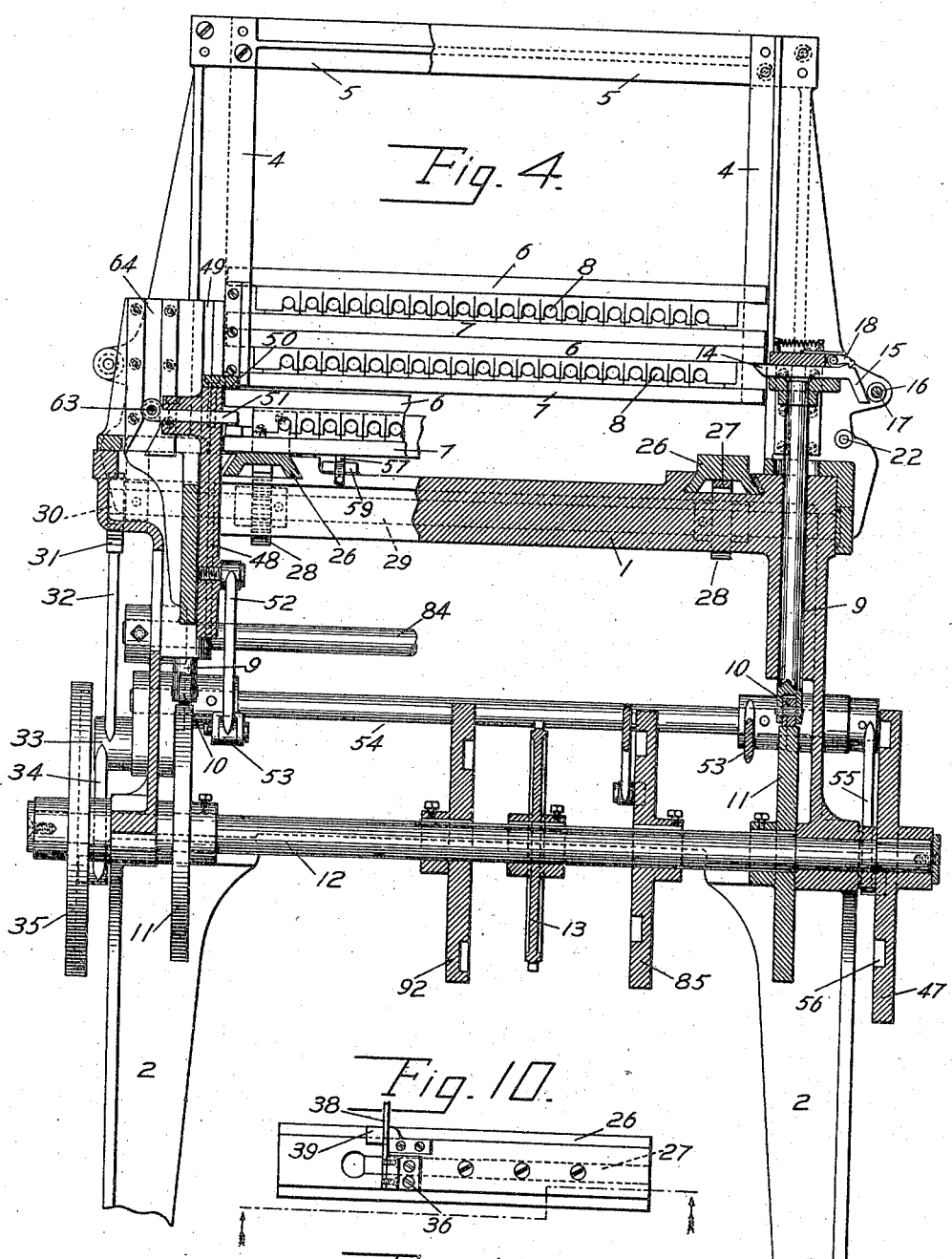

O. TYBERG.
MACHINE FOR REMOVING CIGAR BUNCHES FROM MOLDS.
APPLICATION FILED MAR. 28, 1901.
947,869.
Patented Feb. 1, 1910.
6 SHEETS—SHEET 5.
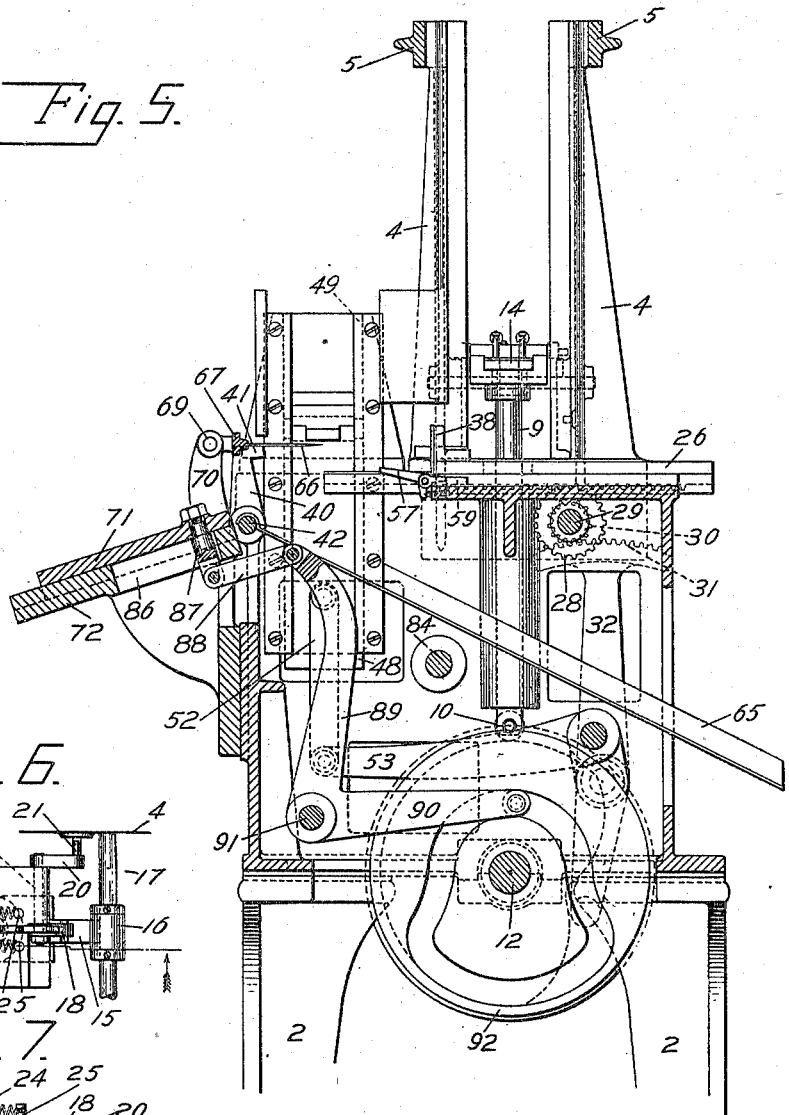
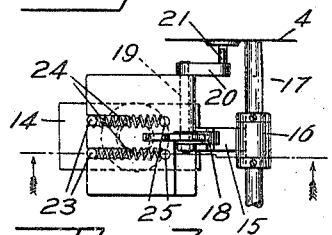
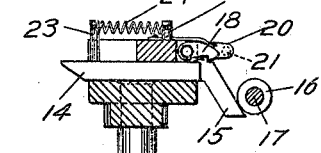
WITNESSES:
INVENTOR
ATTORNEYS O. TYBERG.
MACHINE FOR REMOVING CIGAR BUNCHES FROM MOLDS.
APPLICATION FILED MAR. 28, 1901.

947,869.

Patented Feb. 1, 1910.
6 SHEETS—SHEET 6.

WITNESSES:

INVENTOR

ATTORNEYS

UNITED STATES PATENT OFFICE.

OLUF TYBERG, OF NEW YORK, N. Y., ASSIGNOR TO RUFUS L. PATTERSON AND GEORGE ARENTS, JR., OF NEW YORK, N. Y.

MACHINE FOR REMOVING CIGAR-BUNCHES FROM MOLDS.

947,869.

Specification of Letters Patent.   Patented Feb. 1, 1910.

Application filed March 28, 1901. Serial No. 53,211.

*To all whom it may concern:*

Be it known that I, OLUF TYBERG, a citizen of the United States, residing at New York, county of Kings, and State of New York, have invented certain new and useful Improvements in Machines for Removing Cigar-Bunches from Molds, fully described and represented in the following specification and the accompanying drawings, forming a part of the same.

This invention relates to certain improvements in machines for handling cigar bunches.

In making certain kinds of cigars, it is usual, after the bunch has been completed, to place it in a mold which shapes and sets the bunch. After the bunch has remained in the mold for the proper length of time, it is removed therefrom and the wrapper is applied thereto. The molds usually employed consist of two parts. One of these parts is provided with a plurality of receptacles, the walls of each receptacle forming the sides and bottom of a bunch mold, and the other part carries projections which engage the receptacles and are shaped to complete the molds. These molds are constructed so that the two parts fit snugly, and in the ordinary course of procedure, the molds are separated by hand and the bunches are removed singly by hand and placed in a wrapping machine. The operation of opening and closing the molds by hand and of removing the bunches by hand requires time, and when automatic wrapping machinery is employed, a second operator is frequently required to supply the operator for the wrapping machine with bunches. Furthermore, although the bases of all the molds and the covers of all the molds are intended to be practical counterparts, it has been found by experience that either through uneven shrinkage of the material from which the molds are made, or for other reasons, good results are not obtained when the parts of a plurality of molds are interchanged. It is important, therefore, in handling molds to keep the two parts of each mold together, that is, to keep the cover of the mold with the base for which it was constructed and to which it belongs.

It is one of the objects of this invention to provide a machine by which the cigar bunches may be automatically removed from a mold or other support.

A further object of the invention is to provide means by which a plurality of molds may be automatically handled, so that the bunches may be removed therefrom.

A further object of the invention is to provide a machine by which a plurality of molds may be successively opened, the bunches removed therefrom, the parts of the molds reunited, and the molds discharged.

A further object of the invention is to provide improved mechanism by which the operations referred to are carried into effect.

With these and other objects in view, the invention consists in certain constructions and in certain parts, improvements and combinations, as will be hereinafter described, and then specifically pointed out in the claims hereunto appended.

Figure 2:
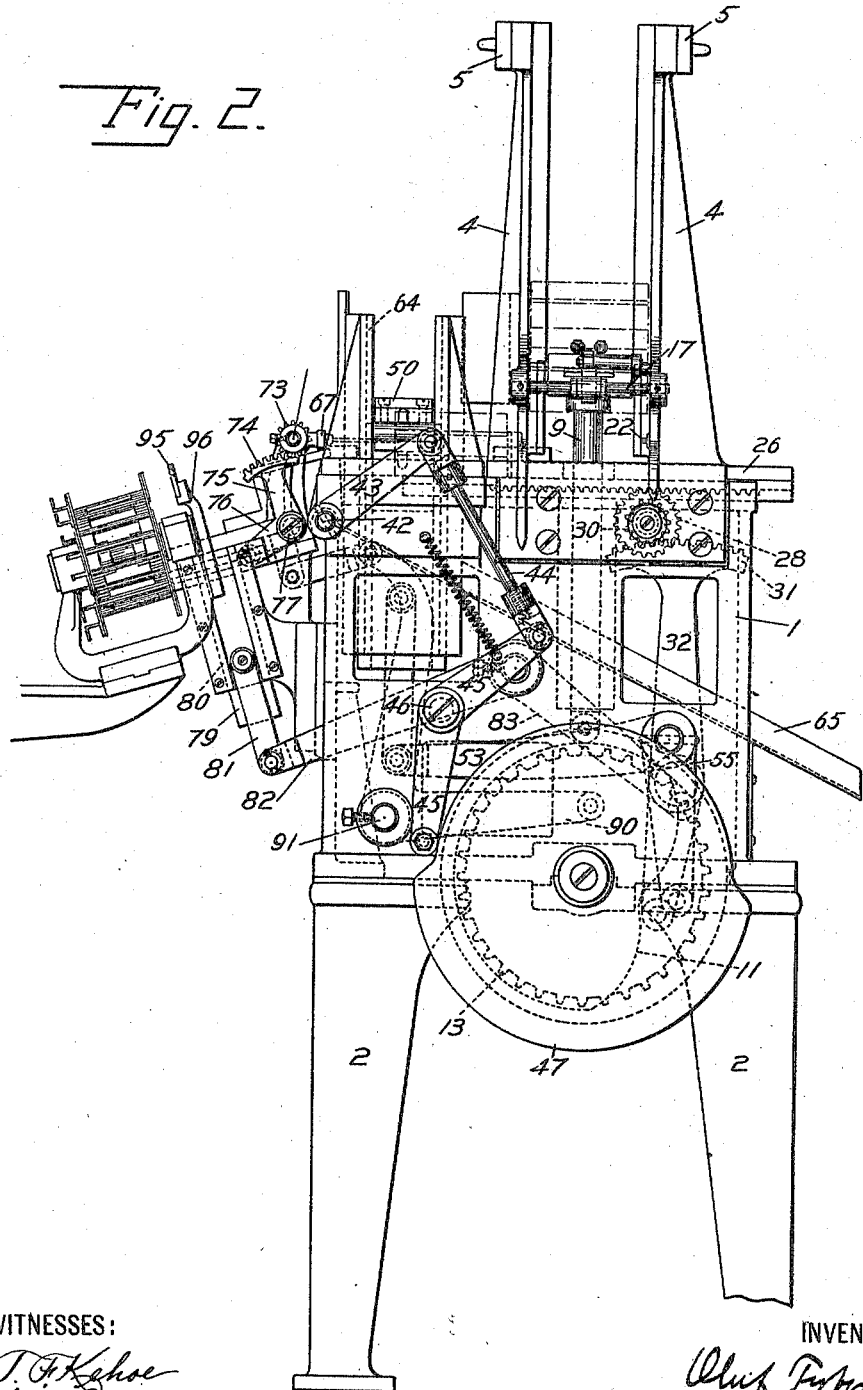
Figure 3:
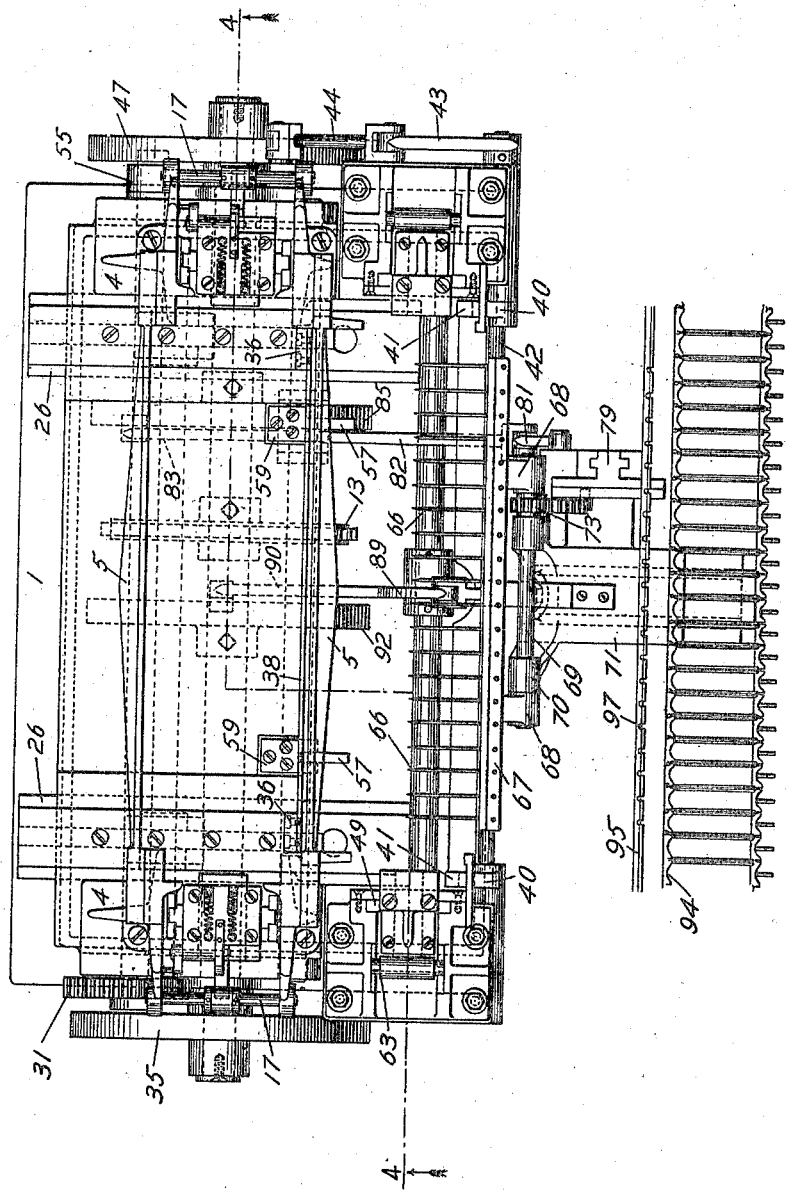

In the accompanying drawings which form a part of this specification and in which like characters of reference indicate the same parts—Figure 1 is a front view of the machine. Fig. 2 is a side view looking at the machine in the direction indicated by the arrow 2 in Fig. 1. Fig. 3 is a plan view of the machine. Fig. 4 is a section on the line 4—4 of Fig. 3. Fig. 5 is a section on the line 5—5 of Fig. 1. Figs. 6, 7 and 8 are detail views illustrating the means by which the plungers lift the stack of molds. Fig. 9 is a detail view illustrating the construction of the mold ejecting device. Figs. 10 and 11 are detail views, illustrating the construction of the slides which form the mold carrier. Figs. 12, 13, 14, 15, 16 and 17 are diagrammatic views illustrating the operation of the machine.

Referring to the drawings which illustrate one embodiment of the invention, 1 indicates a bed which may be of any suitable form or construction, and may be made of any suitable material, the bed having legs 2 secured to the lower part thereof.

Inasmuch as the machine illustrated is designed to automatically remove the bunches from a plurality of molds which are operated upon in succession, means are provided for maintaining the plurality of molds in position in the machine. These means may be varied widely in form and construction. As shown, they consist of two pairs of angular uprights 4 suitably secured to the bed of the machine. In order to stiffen the structure, the uprights of each pair are preferably connected by a cross bar 5.

While the molds operated upon may be of any suitable form, they are preferably the ordinary two-part molds well-known in the art, each of said molds consisting of two parts 6 and 7 which are arranged to provide a plurality of bunch receptacles 8 between them. A plurality of these molds are superposed within the space inclosed by the uprights 4, as clearly indicated in Figs. 1 and 4.

The machine is provided with means for successively presenting the molds to the bunch removing means to be hereinafter described. This is accomplished by successively bringing the molds into such position that they may be acted upon by the bunch removing means, after which the relative movement between the two devices is produced by which the bunch removing means engage the bunches.

While the mold presenting devices may be widely varied in form and the presentation of the molds to the bunch removing means might be effected without removing the molds from the stack, in the machine shown devices are employed for successively removing the bottom mold from the stack and advancing it into position to be operated upon by the bunch removing means.

The present machine embodies devices for raising all the molds of the stack except the bottom one, so that the advancing means may operate freely upon said bottom mold.

The means for raising all the molds, except the bottom one, may be widely varied in construction. As shown, however, the machine is provided with plungers 9 which operate through long bearings formed in the bed. These plungers are arranged to have a vertical movement which may be produced by any suitable means. As shown, each of the plungers 9 is provided with a roller 10 bearing upon a cam 11, both the cams 11 being mounted on a main cam shaft 12 suitably supported in bearings in the machine. This cam shaft may be operated in any suitable manner, but is shown as driven by a sprocket wheel 13.

In order to lift the molds in the manner before referred to, each of the plungers 9 is provided with means for engaging the mold which is next the bottom one of the stack. These engaging means may be of any suitable form, but as shown consist of lifting fingers 14, said fingers being mounted in ways in the tops of the plungers, and being arranged to take under the flanges of the part 6 of the mold. Any suitable means may be used to give the lifting fingers their engaging movement. This movement, however, is preferably effected during the upward movement of the plungers 9 and by the following means. Each of the fingers is provided with an angular projection or of the plunger is forced into contact with a tail 15 which during the upward movement roller 16 mounted on a bar 17. It will be understood that there are two of these bars 17, one for each plunger, and while the bars may be supported in any suitable manner, they are conveniently mounted in the uprights 4, as is clearly shown in Fig. 2.

After the plungers have been operated in the manner described to raise all the molds of the stack except the bottom one, and the advancing means to be hereinafter described has operated to remove the bottom mold, the plungers move downward in order to allow the stack of molds to descend.

In order to prevent the fingers 14 from withdrawing from under the flange of the part 6 of the mold until the stack of molds has reached its lowermost position, locking devices are preferably provided. These locking devices may be of any suitable construction. As shown, however, they consist of spring pawls 18, said pawls being mounted on short shafts 19 (shown in dotted lines in Fig. 6), said shafts being mounted in the tops of the plungers 9. Each of these short shafts 19 is provided with an arm 20 which carries a pin 21 arranged to contact with a projection 22 (see Figs. 2 and 8). The projections 22 are mounted on two of the uprights 4 near the bottoms of said uprights, and the pins 21 do not strike them until the plungers 9 carrying the stack of molds have about completed their downward movement.

While any suitable means may be employed to withdraw the fingers 14, after the locking devices have released them, each of these fingers is shown as provided with pins 23 to which are connected springs 24, the other end of the springs being connected to pins 25 which are mounted on the top of the plunger.

The advancing means for the molds may be of any desired construction. As shown, however, the machine is provided (see Fig. 4) with a pair of slides 26 suitably mounted in ways in the bed of the machine. These slides are arranged to be simultaneously operated and by any suitable means. As shown, each slide is provided on its under side with a rack 27 engaged by a pinion 28. Both the pinions 28 are mounted on a shaft 29 which extends across the machine from side to side. The shaft 29 carries on one of its ends an operating pinion 30 engaged by a toothed sector 31 mounted on an arm 32 which projects from a hub 33 which is mounted on a stud extending from the side of the machine and has connected to it an arm 34 which is operated by a cam 35 carried on one end of the cam shaft 12. As the shaft 12 rotates, it will be seen that the slides are given a simultaneous reciprocating movement across the bed of the machine. The slides are provided near their forward ends with pusher blocks 36 and the front ends of the slides are preferably recessed or gained, as shown at 37 (see Figs. 10, 11). When the slides are in their extreme rearward position these recessed or gained ends 37 are beneath the stack of molds, so that when the stack is lowered by the plungers 9 in the manner hereinbefore described, the bottom mold of the stack will rest upon these ends. The shoulders of the slides and the pusher blocks thus act on the forward movement of the slides to advance the bottom mold of the stack (the others being lifted in the manner hereinbefore set forth) so that the slides form a mold carrier. A plate 38 is or may be provided which extends across from slide 26 to slide 27 and serves to close the openings in the mold so that the bunches will not be displaced under the action of the bunch removing means to be hereinafter described.

When, as will usually be the case, the molds operated upon are two-part molds, devices will be provided for preventing the lower part of the mold from being displaced with respect to the mold carrier when the two parts of the mold are separated. These devices may be varied within wide limits. As shown, however, each of the slides is provided with a holding lug 39. These holding lugs take over the flanges formed on the lower part of the mold. These lugs are short and the slides move back far enough so that the lugs do not interfere with the positioning of the bottom mold of the stack on the recessed extensions 37. At the end of the forward movement of the slides, the mold is forced backward by devices to be hereinafter described until the lugs have taken over the flanges on the part 7.

While the holding lugs 39 might alone be depended upon to retain the molds on the mold carrier, supplementary holding devices are preferably provided which coöperate with the lugs 39 to hold the molds on the carrier. These supplementary holding devices may be constructed in any desired manner. As shown, they consist of arms 40 having projections 41 which take over the flanges on the part 7 of the mold at their forward ends. These arms 40 are mounted on a rock shaft 42 extending across the machine from side to side and provided on one of its ends (see Figs. 1 and 2) with an operating arm 43. This arm 43 is connected by means of an adjustable link 44 to a cam operated bent lever 45 pivoted at 46 to the frame of the machine. This lever carries a roll which is in contact with a cam 47 mounted on the cam shaft 12. The cam 47 is so timed that when the slides reach the extent of their forward movement, the shaft 42 will be rocked and the projections 41 on the arms 40 will engage the forward ends of the flanges on the part 7 of the mold.

When, as in the present case, the machine is designed to operate upon a two part mold, means are provided for opening the molds. These means may be varied widely in construction. In the machine shown, two slides 48 are provided, one at each end of the machine, said slides moving in suitable ways 49. Each of the slides 48 is provided with means for positively engaging the cover of the mold so as to move it in both directions. In the construction shown, each slide 48 is provided with an overhanging ledge 50 which is arranged to engage the top of the part 6 of the mold when the slides are in their normal position. Each of the slides is further provided with an engaging device which takes under the end flange of the top part of the mold. While this engaging device may be of any suitable description, it preferably consists of fingers 51 mounted in the slides and being movable therein at an angle to the direction of movement of the slides, for a purpose to be hereinafter stated.

The lifting movement of the slides may be effected in any suitable manner. As shown, each of the slides is connected by means of a link 52 to an arm 53, the arms 53 being mounted on a rock shaft 54 (see Fig. 4) which extends across the machine from side to side and is mounted in suitable bearings therein. The shaft 54 carries at one of its ends an operating arm 55 which is operated upon by a groove 56 in the cam disk 47 before referred to as operating the lever 45.

In the construction so far described, it will be seen that as the molds are successively advanced, the movement of the slides 48 will, through the engaging means described move the upper part 6 of each mold in succession away from the lower part, after which the bunches will be removed from the mold by a bunch removing means to be hereinafter described. After this is effected, the downward movement of the slides reunites the parts of the mold and the mold is discharged.

The slides 48 are normally so positioned that as the molds are advanced, the flange on the upper portion of each one passes in between the overhanging ledges 50 and the fingers 51. As soon as the molds, therefore, under the control of the mold carrier come into their forward position, the slides begin their upward movement. Inasmuch as the parts of the molds are to be reunited after the bunches have been removed, it is necessary in the particular construction shown that the lower part of the mold remain in the same position that it occupied when the upper part was lifted therefrom, so that the downward movement of the slides will bring the two parts of the mold together.

It will be observed that the closing or reuniting of the parts of the mold takes place directly after the bunches are removed and before the mold is refilled, so that the mold is removed empty from the machine. In the present machine, therefore, the mold carrier is permitted to remain in its advanced position until the slides in their downward movement have replaced the upper part of the mold in position. As soon as this has been done, the mold carrier, through the action of its operating mechanism, begins to retreat.

In order to insure that the mold is not moved backward by the retreating movement of the carrier, an ejecting device will preferably be provided. This ejecting device, in the machine shown, consists of two small bell-crank levers 57 (see Fig. 9) pivoted at 58 to small brackets 59 secured to the machine bed between the slides 26. Each of these bell crank levers 57 is normally held by means of a spring 60 and a small plunger 61, in such position that the end of the lever is slightly above the plane in which the recessed top of the slides move. As the molds are moved forward by the mold carrier, they depress the levers 57, and when they reach their extreme forward position they pass off the ends of the levers which, through the operation of their springs, are thrown up behind the molds. As the mold carrier retreats, therefore, these levers operate to push the molds from the carriers. In order to prevent the levers from being moved upward too far by the molds, should there be any tendency of the molds to remain on the carrier, each of the levers is preferably provided with a small projection 62 which engages the edge of the machine bed and acts as a stop for the lever. Furthermore, as the mold carrier moves back, the arms 40 carrying the engaging projections 41 are also moved back, through the connections by which the rock shaft 40 is operated, so that a clear space is provided for the delivery of the mold.

When the operations which have just been described are effected, it is further necessary in order to discharge the mold to release the fingers 51 from engagement with the top part of the mold. This releasing movement of the fingers 51 may be variously effected. As shown, each of the fingers is provided with a projection 63 which engages a cam groove 64, these cam grooves being preferably formed in the brackets in which the ways 49 are located. As shown in Fig. 4, these grooves 64 are straight for a greater part of their length, but are given a sharp bend near their lower ends. The downward movement of the slides 48 by which the upper parts of the mold are replaced in position is stopped just before the projections 63 reach the bend referred to. After the mold carrier has been withdrawn, however, and the arms 40 rocked backward, the downward movement of the slides 48 is resumed, and the projections 63 traveling into the angular portion of the grooves cause the fingers 51 to move back so that the mold is released. As the fingers 51 are disengaged from the mold, it drops onto a chute 65 and is discharged from the machine.

The means by which the bunches are removed from the molds may be varied widely in construction. In the preferred form of the construction, however, these means include a plurality of pins 66, one for each bunch receptacle of a mold. These pins 66 may be operated by various mechanisms. In the preferred construction, however, the pins will be so positioned that the forward movement of each mold on the mold carrier will cause the bunches in the mold to be impaled by the pins, after which,—the cover of the mold having been removed in the manner before described,—the pins are operated to take the bunches from the mold.

In the construction shown, the pins 66 are mounted in a cross bar 67 provided with lugs 68 which are fast upon a shaft 69. This shaft 69 is mounted in ears 70 rising from a slide 71 mounted on a bracket 72 suitably secured to the side of the machine. The shaft 69 is provided with a pinion 73 engaged by a toothed sector 74 which is preferably formed integrally with a bell crank lever 75, 76 pivoted at 77 to the slide 71. The arm 76 of the bell-crank lever carries a friction roller which engages a groove 78 in a slide 79 mounted in ways 80 which are connected to the bracket 72 which supports the slide 71. The slide 79 is connected by means of a link 81 to a two-armed lever 82, 83, pivoted to a bar 84 which extends across the machine from side to side. The arm 83 engages a cam groove in a disk 85 mounted on the cam shaft 12.

Through the connections which have been described, it is obvious that the pins 66 will be given a rotating movement by which the bunches which have been impaled thereon will be lifted off the bunch receptacles. This rotating movement might be depended upon entirely to effect the discharge of the bunches, but this would require a considerably greater movement of the devices which lift the upper part of the mold than is desirable in a machine of this character. For this reason, therefore, the rotating movement of the shaft 69 is intermitted substantially as soon as the bunches are free from the mold, and the shaft and pins are given a bodily movement backward so as to carry the bunches away from the mold, after which the rotating movement of the shaft is again resumed.

In order to effect the backward or withdrawing movement, the slide 71 which has been described is utilized. The bracket 72 is formed with an opening 86 through which extends a stud 87 connected to the slide 71. The lower part of the stud 87 is connected by means of a link 88 to one of the arms 89 of a bell crank lever 89, 90 mounted on a bar 91 (see Figs. 1 and 5) which extends across the machine from side to side. The arm 90 carries a roll which engages a cam groove in a disk 92 mounted on the shaft 12. As soon, therefore, as the pins through their operating mechanism have been raised so as to clear the bunches from the mold, the slide 71 is operated through the mechanism just described and carries the pins backward until the bunches are clear of the mold. The rotating movement of the shaft 69 which carries the pins is then resumed and the bunches brought into a convenient position to discharge them from the pins.

While the pins may be caused to place the bunches on any suitable receiver, as shown a traveling chain is used, said chain being provided with grooved rests 94 which receive the bunches.

Any suitable means may be provided for removing the bunches from the pins. In the construction shown, however, a stripper bar 95 mounted on arms 96 is provided, said bar having grooves 97 so located that at the end of their movement the pins engage these grooves. After the pins have been brought into engagement with the grooves, the slide 71 is given a reverse movement and the bar 95 strips the bunches from the pins.

The operation of the machine as a whole will be well understood from the foregoing description taken in connection with the diagrams Figs. 12 to 17 inclusive: In the first of these diagrams, the pins 66 are shown in their bunch receiving position, the slide 71 being in its extreme forward position. The mold carrying slides 26 are shown as having partially advanced the bottom mold of the stack. In Fig. 13 the mold carrying slides 26 are shown in their extreme forward position and the bunches as being impaled upon the pins. Fig. 14 illustrates the positions of the various parts after the lifting devices have operated to lift the upper part 6 of the mold and after the shaft 69 has received a partial rotation to lift the bunches from the lower part 7 of the mold. Fig. 15 illustrates the position of the parts after the top part 6 of the mold has been replaced upon the bottom part 7 and the slide 71 has been given its backward movement. In this figure, furthermore, the shaft 69 has again resumed its rotation and is carrying the bunches toward the bunch receiving chain. Fig. 16 illustrates the position of the parts after the shaft 69 has completed its rotation and the bunches are laid in the rests in the chain. In this figure, therefore, the mold carrier has withdrawn and the parts of the reunited mold have been released by the lifting devices for the top part of the mold. In Fig. 17 the slide 71 has been moved so as to withdraw the pins from the bunches and the mold is shown as moving down the chute 65 out of the machine.

While the several constructions by which the several operations which have been described are carried into effect are effective for the purposes which have been set forth, it is to be understood that the invention may be embodied in constructions which differ widely from those which have been described. It is to be further understood that certain features of the invention are capable of use independently of other features and such independent use is contemplated. The invention is not, therefore, to be limited to the specific devices which have been heretofore described.

What is claimed is:—

1. The combination with a bunch support operating to sustain a plurality of bunches, of mechanism for simultaneously removing the bunches from and transporting them from the support, substantially as described.

2. The combination with a bunch support operating to sustain a plurality of bunches, of a lifting device including means for engaging each bunch, and devices for operating the lifting device to remove the bunches from and transport them from the support, substantially as described.

3. The combination with a bunch support operating to sustain a plurality of bunches, of a bunch removing device including means for simultaneously engaging the bunches, and means for operating the device to cause it to engage the bunches and thereafter remove them from the support, substantially as described.

4. The combination with a bunch support operating to sustain a plurality of bunches, of a lifting device including means for engaging each bunch, and devices for operating the lifting device to simultaneously remove the bunches from and transport them from the support, substantially as described.

5. The combination with means for supporting a mold having a plurality of bunch receptacles, of means for removing the bunches from said receptacles and transporting them from the mold, substantially as described.

6. The combination with means for supporting a mold having a plurality of bunch receptacles, of means for simultaneously removing the bunches from said receptacles and transporting them from the mold, substantially as described.

7. The combination with means for supporting a bunch mold comprising a base and cover, of means for opening and closing the mold, and means for removing the bunch therefrom, the closing operation being effected directly after the removal of the bunch and before the mold is refilled.

8. The combination with means for supporting a bunch mold comprising a base and cover, of means for opening and closing the mold, means for removing the bunch therefrom, the closing of the mold being effected directly after the bunch is removed and before the mold is refilled, and means for discharging the mold, substantially as described.

9. The combination with means for supporting a bunch mold comprising a base and cover, said mold having a plurality of bunch receptacles, of means for opening the mold, and means for simultaneously removing the bunches from the mold, substantially as described.

10. The combination with means for supporting a bunch mold comprising a base and cover, said mold having a plurality of bunch receptacles, of means for opening and closing the mold, and means for simultaneously removing the bunches from the mold, substantially as described.

11. The combination with means for supporting a bunch mold comprising a base and cover, said mold having a plurality of bunch receptacles, of means for opening and closing the mold, and means for simultaneously removing the bunches from the mold, and means for discharging the mold, substantially as described.

12. The combination with means for removing a plurality of bunches from a mold, of means for successively presenting molds having a plurality of receptacles to the bunch removing means, substantially as described.

13. The combination with means for advancing bunch molds, each mold having a plurality of bunch receptacles, of means for simultaneously removing the bunches from the receptacles of each mold, substantially as described.

14. The combination with means for removing a plurality of bunches from a mold, of means for presenting to said means a bunch mold comprising a base and cover and having a plurality of bunch receptacles, and means for opening the mold, substantially as described.

15. The combination with means for successively presenting bunch molds, each mold comprising a base and a cover and provided with a plurality of bunch receptacles, means for opening the molds, and bunch removing means operating to simultaneously engage the bunches in the receptacles of each mold, substantially as described.

16. The combination with means for successively presenting bunch molds, each mold comprising a base and a cover and provided with a plurality of bunch receptacles, means for opening and closing the molds, bunch and removing means operating to simultaneously engage the bunches in the receptacles of each mold, substantially as described.

17. The combination with means for successively presenting bunch molds, each mold comprising a base and a cover and provided with a plurality of bunch receptacles, means for opening and closing the molds, bunch removing means operating to simultaneously engage the bunches in the receptacles of each mold, and means for discharging the molds, substantially as described.

18. The combination with a bunch support, of bunch removing means, said means including a bunch impaling device, and means for operating said bunch removing means to transport the bunch from the support, substantially as described.

19. The combination with a bunch support operating to sustain a plurality of bunches, of bunch removing means, said means including a plurality of bunch impaling devices, and means for operating said bunch removing means to transport the bunches from the support, substantially as described.

20. The combination with a bunch support operating to sustain a plurality of bunches, of bunch removing means, said means including a plurality of bunch impaling devices, and means for simultaneously operating said impaling devices to remove the bunches from the support, substantially as described.

21. The combination with means for sustaining a two-part mold in position, said mold being constructed to contain a plurality of bunches, of a bunch removing device including a plurality of impaling pins, means for moving said device to cause the pins to impale the bunches in the mold and to thereafter remove them from the mold, and means for separating the parts of the mold, substantially as described.

22. The combination with means for supporting a mold having a plurality of bunch receptacles, of a bunch removing means having a plurality of bunch impaling devices, and means for simultaneously operating said devices to remove the bunches from the mold, substantially as described.

23. The combination with means for supporting a mold comprising a base and a cover and having a plurality of bunch receptacles, of means for opening the mold, bunch removing means having a plurality of bunch impaling devices, and means for simultaneously operating said devices, substantially as described.

24. The combination with means for sustaining a two-part mold in position, said mold being constructed to contain, a plurality of bunches, of a bunch removing device including a plurality of impaling pins, means for moving said device to cause the pins to impale the bunches in the mold and to thereafter remove them from the mold, and means for separating the parts of the mold and uniting them after the bunches have been removed, substantially as described.

25. The combination with means for supporting a mold comprising a base and a cover and having a plurality of bunch receptacles, of means for opening and closing the mold, bunch removing means having a plurality of bunch impaling devices, and means for simultaneously operating said devices, substantially as described.

26. The combination with means for supporting a mold comprising a base and a cover and having a plurality of bunch receptacles, of means for opening and closing the mold, bunch removing means having a plurality of bunch impaling devices, means for simultaneously operating said devices, and means for discharging the mold, substantially as described.

27. The combination with a bunch support operating to sustain a plurality of bunches, of bunch removing means including a plurality of impaling devices, means for operating said devices to simultaneously remove the bunches from the bunch support, and means for removing the bunches from the impaling devices, substantially as described.

28. The combination with means for supporting a mold comprising a base and a cover and having a plurality of bunch receptacles, of means for opening the mold, bunch removing means including a plurality of impaling devices, means for operating said devices to simultaneously remove the bunches from the mold, and means for removing the bunches from the impaling devices, substantially as described.

29. The combination with means for supporting a mold comprising a base and a cover and having a plurality of bunch receptacles, of means for opening and closing the mold, bunch removing means including a plurality of impaling devices, means for operating said devices to simultaneously remove the bunches from the mold, and means for removing the bunches from the impaling devices, substantially as described.

30. The combination with means for supporting a mold comprising a base and a cover and having a plurality of bunch receptacles, of means for opening and closing the mold, bunch removing means including a plurality of impaling devices, means for operating said devices to simultaneously remove the bunches from the mold, means for removing the bunches from the impaling devices, and means for discharging the mold, substantially as described.

31. The combination with means for supporting a stack of bunch molds, each mold having a plurality of bunch receptacles, of means for successively positioning the molds of the stack, and bunch removing means operating to simultaneously remove the bunches from the bunch receptacles of each mold, substantially as described.

32. The combination with means for supporting a stack of bunch molds each mold comprising a base and cover and having a plurality of bunch receptacles, of bunch removing means operating to simultaneously remove the bunches from the receptacles of each mold, means for successively presenting the molds of the stack to said bunch removing means, and means for opening and closing the molds, substantially as described.

33. The combination with means for supporting a stack of bunch molds, each comprising a base and cover and having a plurality of bunch receptacles, of means for successively advancing the molds of the stack, means for opening and closing the molds, and bunch removing means operating to simultaneously remove the bunches from the bunch receptacles of each mold, and means for discharging the molds, substantially as described.

34. The combination with means for supporting a stack of bunch molds each mold having a plurality of bunch receptacles, of bunch removing means including a plurality of impaling devices, and means for successively presenting the molds of the stack thereto, substantially as described.

35. The combination with means for supporting a stack of bunch molds each mold comprising a base and cover and having a plurality of bunch receptacles, of means for opening the molds, bunch removing means including a plurality of impaling devices, and means for successively presenting the molds of the stack thereto, substantially as described.

36. The combination with means for supporting a stack of bunch molds each mold comprising a base and cover and having a plurality of bunch receptacles, of means for opening and closing the molds, bunch removing means including a plurality of impaling devices, and means for successively presenting the molds of the stack thereto, substantially as described.

37. The combination with means for supporting a stack of bunch molds each mold comprising a base and cover and having a plurality of bunch receptacles, of means for opening and closing the molds, bunch removing means including a plurality of impaling devices, means for successively presenting the molds of the stack thereto, and means for discharging the molds, substantially as described.

38. The combination with means for supporting a stack of bunch molds, of means for separating the bottom mold from the stack, means for advancing said mold, and bunch removing means, substantially as described.

39. The combination with means for supporting a stack of bunch molds, each mold having a plurality of bunch receptacles, of means for separating the bottom mold from the stack, means for advancing said mold, and bunch removing means including impaling devices operating to simultaneously remove the bunches from each mold, substantially as described.

40. The combination with means for supporting a stack of bunch molds, each mold comprising a base and a cover and provided with a plurality of bunch receptacles, of means for separating the bottom mold from the stack, means for advancing said mold, means for opening and closing the mold, bunch removing means, and means for discharging the mold, substantially as described.

41. The combination with means for supporting a stack of bunch molds, each mold comprising a base and a cover and provided with a plurality of bunch receptacles, of means for separating the bottom mold from the stack, means for advancing said mold, means for opening and closing the mold, bunch removing means including impaling devices, means for removing the bunches from the impaling devices, and means for discharging the mold, substantially as described.

42. The combination with suitable guides operating to maintain a stack of molds in position, of a set of vertically moving plungers, means carried by the plungers for engaging the mold which is next to the bottom of the stack, whereby all the molds of the stack except the bottom one are moved upwardly, and means for advancing the bottom mold of the stack, substantially as described.

43. The combination with suitable guides operating to maintain a stack of bunch molds in position, of a set of vertically moving plungers, engaging devices carried by the plungers, and means operating during the upward movement of the plungers to cause said devices to engage one of the molds of the stack, substantially as described.

44. The combination with a set of vertically movable plungers, of a lifting finger carried by each plunger, means for giving the fingers during the movement of the plungers a movement at an angle to the movement of the plungers, devices for locking the fingers in their forward position, and releasing devices, substantially as described.

45. The combination with a set of lifting plungers, of a lifting finger mounted in each plunger, an operating projection on said finger, a part in the path of movement of the projection and operating on the movement of the plunger to give a movement at an angle to the movement of the plunger, a locking pawl, and means for releasing the locking pawl on the downward movement of the plunger, and means for retracting the finger, substantially as described.

46. The combination with means for maintaining a stack of bunch molds in position, each mold comprising a base and a cover, of advancing means operating to remove one of the molds from the stack, retaining devices for one part of the mold, and devices for separating the two parts of the mold, substantially as described.

47. The combination with means for maintaining a stack of bunch molds in position, each mold comprising a base and a cover, of advancing means operating to remove one of the molds from the stack, retaining devices for one part of the mold, devices for separating and re-uniting the two parts of the mold, and bunch removing means, substantially as described.

48. The combination with an advancing means, of holding devices for one part of a separable mold, holding devices operating upon the other part of said mold, and means for separating the two sets of holding devices, substantially as described.

49. The combination with an advancing means, of holding devices for one part of a separable mold, holding devices operating upon the other part of said mold, means for separating the two sets of holding devices, and bunch removing means, substantially as described.

50. The combination with an advancing means, of holding devices for one part of a separable bunch mold, holding devices operating upon the other part of said mold, means for separating the two sets of holding devices, bunch removing means, and means for bringing together the two sets of holding devices after the bunch removing means have operated, substantially as described.

51. The combination with a mold carrier, of holding devices operating to secure one part of a separable mold thereto, holding devices operating upon the other part of said mold, means for separating said holding devices and the carrier, and bunch removing means, substantially as described.

52. The combination with a mold carrier, of holding devices operating to secure one part of a separable mold thereto, holding devices operating upon the other part of said mold, means for separating said holding devices and the carrier, bunch removing means, and means for bringing together the holding means and the carrier to reunite the parts of the mold after the removing means have operated, substantially as described.

53. The combination with a mold carrier, of devices for retaining a two-part mold thereon, a set of lifting slides having means for positively engaging one of the parts of the mold, means for moving the lifting devices toward and away from the mold carrier, and bunch removing means, substantially as described.

54. The combination with a reciprocating mold carrier, having holding projections, of a set of movable projections coöperating with the holding projections for retaining one part of a two part mold on the carrier, a set of lifters including devices for positively engaging the other part of the mold, means for moving the lifters toward and away from the mold carrier, and bunch removing means, substantially as described.

55. The combination with a set of impaling pins, of means for supporting a plurality of cigar bunches, means for producing a relative movement between the bunch supporting means and the pins, whereby the bunches are impaled upon the pins, and means for producing a relative movement between the bunch supporting means and the pins whereby the bunches are removed from the supporting means, substantially as described.

56. The combination with a set of impaling pins, of means for supporting a plurality of cigar bunches, means for producing a relative movement between the bunch supporting means and the pins, whereby the bunches are impaled upon the pins, means for producing a relative movement between the bunch supporting means and the pins whereby the bunches are removed from the supporting means, and means for thereafter removing the bunches from the pins, substantially as described.

57. The combination with a set of impaling pins, of a mold having a plurality of bunch receptacles, means for producing a relative movement between the mold and the pins, whereby the bunches are impaled upon the pins, and means for producing a relative movement between the mold and the pins whereby the bunches are removed from the mold, substantially as described.

58. The combination with a set of impaling pins, of means for advancing a mold having a plurality of bunch receptacles, the movement of the mold operating to impale the bunches on the pins, and means for operating the pins to remove the bunches from the mold, substantially as described.

59. The combination with a set of impaling pins, of means for advancing a mold having a plurality of bunch receptacles, the movement of the mold operating to impale the bunches on the pins, means for operating the pins to remove the bunches from the mold, and means for removing the bunches from the pins, substantially as described.

60. The combination with a set of impaling pins, of a mold having a plurality of bunch receptacles, means for producing a relative movement between the pins and the mold, whereby the bunches are impaled upon the pins, and means for operating the pins to lift the bunches from the bunch receptacles, substantially as described.

61. The combination with a set of impaling pins, of means for supporting a two-part mold, means for producing a relative movement between the pins and the mold, means for opening and closing the mold, means for giving the pins a movement to lift the bunches from the mold, and means for withdrawing the pins carrying the bunches, substantially as described.

62. The combination with means for sustaining a two-part mold in position, of means for separating and reuniting the parts of the mold, a carrier, a bunch removing device operated by the carrier, means for producing a relative movement between the carrier and the mold to cause the removing device to engage the bunches, means for operating the bunch removing device to free the bunches from the mold, and means for moving the carrier away from the mold, substantially as described.

63. The combination with a slide, of a shaft mounted thereon, a set of impaling pins carried by the shaft, means for causing a plurality of cigar bunches to be impaled by the pins, means for operating the slide, and means for rocking the shaft, substantially as described.

64. The combination with a slide, of a shaft mounted thereon, means for moving the slide, a set of impaling pins carried by the shaft, a second slide, connections between the second slide and the shaft whereby a movement of said slide rocks the shaft, and means for giving the second slide an interrupted movement, substantially as described.

65. The combination with a set of impaling pins, of means for presenting a plurality of bunches so as to be impaled by the pins, means for operating the pins to remove the bunches from the presenting means, and a stripper bar operating in connection with the pins to remove the bunches therefrom substantially as described.

66. The combination with a slide, of a shaft mounted therein, means for moving the slide, a set of impaling pins carried by the shaft, means for presenting a bunch mold to the pins so that the bunches carried by the mold will be impaled by the pins, means for giving the shaft a limited movement to lift the bunches from the mold, means for operating the slide to withdraw the pins from the bunches, means for continuing the rotation of the shaft, a stripper bar located in the path of movement of the pins, and means for operating the slide to withdraw the pins from the bunches, substantially as described.

67. The combination with means for supporting a stack of two-part bunch molds, each of which is provided with a plurality of bunch receptacles, of means for successively removing the molds from the stack, a set of impaling pins upon which the bunches are impaled by the movement of the mold, means for opening and closing the molds, means for operating the pins to remove the bunches therefrom, and means for discharging the molds, substantially as described.

68. The combination with means for supporting a stack of two-part molds, each mold having a plurality of bunch receptacles, of a mold carrier for removing the bottom mold from the stack, holding means for one part of the mold, a set of impaling pins located so that the movement of the mold carrier impales the bunches on the pins, a set of lifters including devices for positively engaging the other part of the mold, means for moving the lifters to open and close the mold, means for operating the pins to remove the bunches from the mold, means for discharging the mold, and means for removing the bunches from the pins, substantially as described.

69. The combination with means for supporting a mold containing a plurality of bunches, of a bunch receiver, and means for simultaneously transferring the bunches from the mold to the receiver, substantially as described.

70. The combination with means for supporting a mold containing a plurality of bunches, of a traveling bunch receiver, and means for simultaneously transferring the bunches from the mold to the receiver, substantially as described.

71. The combination with means for supporting a mold containing a plurality of bunches, of a bunch receiver comprising a traveling chain having grooved rests, and means for simultaneously transferring the bunches from the mold to the receiver, substantially as described.

In testimony whereof, I have hereunto set my hand, in the presence of two subscribing witnesses.

OLUF TYBERG.

Witnesses:
   GEO. M. GALES,
   MARTIN S. WATTS.